United States Patent [19]

Anderson et al.

[11] Patent Number: 5,183,646
[45] Date of Patent: Feb. 2, 1993

[54] INCINERATOR FOR COMPLETE OXIDATION OF IMPURITIES IN A GAS STREAM

[75] Inventors: Lawrence B. Anderson, Encinitas; Timothy E. Hammon, Cardiff; Cliff Frieler, Highland Park, all of Calif.

[73] Assignee: Custom Engineered Materials, Inc., San Diego, Calif.

[21] Appl. No.: 662,124

[22] Filed: Feb. 28, 1991

Related U.S. Application Data

[63] Continuation-in-part of Ser. No. 486,617, Feb. 28, 1990, abandoned, which is a continuation-in-part of Ser. No. 355,987, May 22, 1989, abandoned, and a continuation-in-part of Ser. No. 336,718, May 12, 1989, abandoned.

[51] Int. Cl.$^5$ .................. B01D 53/34; F01N 3/26; F23D 14/66; F23D 14/84
[52] U.S. Cl. ........................ 423/210; 422/173; 422/176; 422/182; 422/183; 423/240 S; 423/245.3; 431/3; 431/5; 431/9; 431/11; 431/122; 431/123; 431/157; 431/215
[58] Field of Search ............... 423/210, 240 R, 245.3; 422/168, 173, 176, 182, 183; 431/3, 5, 9, 11, 32, 122, 123, 157, 164, 215

[56] References Cited

U.S. PATENT DOCUMENTS

| 329,087 | 10/1885 | Schartau | 431/215 |
|---|---|---|---|
| 857,808 | 6/1907 | Jackson | 431/32 |
| 2,601,041 | 6/1952 | Logan | 431/32 |
| 3,238,991 | 3/1966 | Goldmann et al. | 431/11 |
| 3,256,924 | 6/1966 | Campbell et al. | 431/171 |
| 3,268,296 | 8/1966 | Hall et al. | 423/481 |
| 3,522,016 | 7/1970 | Groves et al. | 431/122 |
| 3,733,824 | 5/1973 | Grainger | 60/224 |
| 3,895,494 | 10/1975 | Childree | 431/5 |
| 3,917,796 | 11/1975 | Ebeling | 423/210 |
| 3,930,802 | 1/1976 | Beasley et al. | 431/5 |
| 4,043,512 | 8/1977 | Trozzi | 431/173 |
| 4,089,629 | 5/1978 | Baumgartner | 431/9 |
| 4,113,421 | 9/1978 | Miyahara | 431/122 |

(List continued on next page.)

FOREIGN PATENT DOCUMENTS 2584800 1/1987 France .................... 431/11

OTHER PUBLICATIONS

Press Release from Innovative Engineering of California, "New CDO TM systems for controlled disposal of

(List continued on next page.)

Primary Examiner—Jeffrey E. Russel
Attorney, Agent, or Firm—Knobbe, Martens, Olson & Bear

[57] ABSTRACT

A device for oxidizing gaseous materials, comprising a combustion chamber, wherein the device and the combustion chamber both have a top and a bottom, the device further having a gas outlet and being adapted to operate in conjunction with means applying negative pressure to the outlet, means for introducing process gas and a source of fuel into the top of the combustion chamber, means for effecting heat exchange between oxygen-containing gas and the combustion chamber to preheat the oxygen-containing gas, means for introducing the preheated gas into the top of the combustion chamber, means for mixing the preheated gas with the process gas and fuel so that the mixture can burn in the combustion chamber to form an exhaust gas, means for permitting the gas to exit from the bottom of the combustion chamber, means for diluting the exhaust with air to form a flue gas, and means for directing the flue gas from the bottom of the combustion chamber out of the outlet of the device. The heat exchanger may concentrically surround the combustion chamber, and the preheated oxygen-carrying gas may swirl in a first direction as it enters the combustion chamber, there to be mixed with process gas and fuel swirling in the opposite direction. Means may be provided for removing particulate materials from the combustion chamber. Also disclosed is a method for incinerating materials in a gas stream using the disclosed incinerator.

26 Claims, 6 Drawing Sheets

U.S. PATENT DOCUMENTS

| | | | |
|---|---|---|---|
| 4,116,388 | 9/1978 | Trozzi | 239/406 |
| 4,206,712 | 6/1980 | Vatsky | 431/183 |
| 4,253,403 | 3/1981 | Vatsky | 431/181 |
| 4,270,895 | 6/1981 | Vatsky | 431/183 |
| 4,338,870 | 7/1982 | Lanier, Jr. | 110/346 |
| 4,342,552 | 8/1982 | Trippet | 431/183 |
| 4,378,334 | 3/1983 | Alguire et al. | 422/110 |
| 4,383,820 | 5/1983 | Camacho | 431/183 |
| 4,401,099 | 8/1983 | Collier | 431/9 |
| 4,462,318 | 7/1984 | Carbeau et al. | 110/244 |
| 4,472,133 | 9/1984 | Peterson et al. | 431/3 |
| 4,520,741 | 6/1985 | Carbeau et al. | 110/244 |
| 4,555,389 | 11/1985 | Soneta et al. | 423/210 |
| 4,622,811 | 11/1986 | Distel et al. | 431/172 |
| 4,661,056 | 4/1987 | Vickery et al. | 431/5 |
| 4,690,075 | 9/1987 | Vidal et al. | 431/183 |
| 4,716,725 | 1/1988 | Dettling et al. | 422/173 |
| 4,725,223 | 2/1988 | Coppin et al. | 431/115 |
| 4,740,154 | 4/1988 | Cantoni | 431/11 |
| 4,788,004 | 11/1988 | Pinto et al. | 252/373 |
| 4,801,437 | 1/1989 | Konagaya et al. | 423/210 |
| 4,911,955 | 3/1990 | Mottet et al. | 427/422 |
| 4,938,685 | 1/1990 | Noakes et al. | 431/4 |

OTHER PUBLICATIONS toxic, flammable, and pyrophoric gases . . . "
Sales brochure by Heat Systems Ultrasonics, Inc. for Inertron Toxic Gas Incinerators (Oct. 1987).
Sales brochure by Innovative Engineering for Exhaust Gas Conditioning Equipment.
Sales brochure by Nippon Sanso K.K. for toxic gas scrubber.

INCINERATOR FOR COMPLETE OXIDATION OF IMPURITIES IN A GAS STREAM

RELATION TO RELATED APPLICATIONS

This application is a continuation-in-part of patent application Ser. No. 486,617, filed Feb. 28, 1990, now abandoned, which is a continuation-in-part of patent application Ser. No. 355,987 filed May 22, 1989, now abandoned and patent application Ser. No. 336,718 filed Apr. 12, 1989, now abandoned. Priority of subject matter in this application common with subject matter in application Ser. Nos. 486,617, 336,718 and 355,987, all now abandoned, is hereby claimed.

BACKGROUND OF THE INVENTION

The present invention relates to an apparatus and method for completely incinerating oxidizable impurities in a process gas, including a nonflammable gas stream. It is particularly suitable for treatment of waste gases from semiconductor fabrication processes, and other gases containing highly toxic, pyrophoric, or otherwise undesirable impurities.

Semiconductor manufacturing processes utilize a variety of chemicals, many of which have extremely low human tolerance levels. Such materials include gaseous hydrides of antimony, arsenic, boron, germanium, nitrogen, phosphorous, silicon, selenium and other chemical elements. Typically used compounds include arsine, diborane, germane, hydrogen selenide, phosphine, silane, stibine and many others including halogenated derivatives of the above hydrides, hydrogen chloride, tungsten hexafluoride and a wide variety of metal-organic compounds as well. Acceptable exposure levels for certain of these materials are as low as 50 parts per billion in air that may be inhaled. A significant problem has been the removal of these materials from the effluent gas streams of semiconductor manufacturing processes. While virtually all U.S. semiconductor manufacturing facilities utilize scrubbers or other related means for treatment of their effluent gases, that technology is not capable of removing all toxic or otherwise unacceptable impurities.

Although the levels of arsine, phosphine and other similarly toxic materials in typical process gas streams are relatively low, and can be further reduced by scrubbers, these levels are, under various state and federal standards, still above acceptable levels. On the other hand, if it were possible to effect substantially complete oxidation of these impurities, those oxidation products could be reduced to acceptable levels by conventional scrubber technology.

One solution to this problem, then, is to incinerate the process gas to oxidize the toxic materials, converting them to less toxic form. Conventional incinerators, however, typically achieve less than complete combustion. This is particularly so when the impurity to be incinerated is present in relatively low quantities. The problem is compounded when the process stream to be treated is composed primarily of a nonflammable gas such as nitrogen bearing the undesirable impurities. While some of the oxidizable impurities are removed by conventional incinerators, at least a portion of those impurities can escape the combustion zone, thereby creating at least the potential of toxic discharge into the atmosphere.

Another problem with utilization of conventional incinerators is the size of the incinerator and the temperature of the flue gas exiting the incinerator. Many semiconductor fabrication facilities have heretofore used scrubbers as the primary means for removing the impurities in question. In a large number of cases, recent more stringent air pollution regulations have necessitated a reduction in emissions. Even after an incinerator is installed, the scrubber will need to treat the flue gas of the incinerator to remove the oxides of the incinerated impurities. Thus, the incinerator will be installed, in many instances, as a retrofit device. The ducting and other process gas handling equipment in many existing facilities is not designed for high temperature gas, and flue gas from conventional incinerators can melt plastic ducting and/or create fire hazards.

Because retrofit applications are contemplated, the size of the incinerator is also a major concern. Desirably, the incinerator can fit and utilize existing ducting without requiring substantial additional space.

A further limitation of conventional incinerators is their lack of ability to both mix sufficient fuel with a nonflammable process stream in order to render it flammable and then to also achieve complete combustion of this fuel enriched gas. The choice of such fuel gas to be mixed with a nonflammable process gas is also important from the perspective of maintaining low operating costs, and the design must reflect this choice of fuel if proper burning characteristics are to be achieved.

Another problem with existing incinerators is their inability to handle the formation of solid oxides. The oxidation products of certain gaseous impurities in the waste gas from semiconductor and other processes are solids. For example, silanes oxidize to silica (sand). Accumulations of silica in most incinerators represents a substantial maintenance problem when those devices are used in the treatment of silane-containing gas streams.

In addition to converting toxic materials to their less toxic oxides, controlled incineration is desirable when the waste gas stream contains potentially flammable or explosive materials. Some semiconductor process gas streams, for example, contain substantial quantities of hydrogen gas or organic solvents, presenting obvious explosion hazards. Similarly, the presence of pyrophoric gases such as silanes can also present an explosion hazard. (Such pyrophoric materials have a tendency to spontaneously ignite in the presence of oxygen.)

An additional hazard potential exists when pipes leading to the incinerator contain premixed combustible mixtures which might be ignited by the incinerator flame and then propagate a flame backwards into the pipe with concomitant explosion potential. When conventional flame arrestors are used to prevent such flashbacks from occurring, they tend to plug up very quickly because of the solid oxide particles which are typically present in such mixtures, particularly those containing silane.

Accordingly, one object of the present invention is to provide an incinerator having increased ability to oxidize virtually all oxidizable components in a waste gas stream.

Another object of the present invention is to provide controlled combustion of flammable or explosive components of a waste gas.

Still another object of the present invention is to provide an incinerator that is compact and can merge with existing ducting.

Another object of the present invention is to provide an incinerator which converts a nonflammable gas stream into a flammable stream through the mixing in of additional fuel gas such that the entire mixture is burned and not merely heated in the incinerator.

A further object is to provide an incinerator which can effectively make use of inexpensive fuel in carrying out the conversion of nonflammable to flammable mixtures.

Yet another object is to provide an incinerator that has an effluent flue gas which is sufficiently cool to be compatible with existing ducting.

Another object is to provide an incinerator with improved capabilities for handling solid particulate combustion products.

An additional object of the present invention is the prevention of flashbacks without the associated plugging which typically occurs with use of conventional flame arrestors.

A further object is to reduce the tendency for all reactions to accelerate within the inlet pipe close to the flame by cooling the inlet section. Of particular interest among these reactions are those whose solid products of reaction tend to deposit in the pipes and clog them, as well as those reactions which accelerate flame speed as temperature is raised. One embodiment of the present invention employs active cooling of the inlet pipe(s).

Yet another object of the present invention is to increase the flow speed of gases introduced therein, such as nitrogen, which further reduces the likelihood of flashbacks by exceeding the normal flame propagation speed in the inlet section and by tending to dilute incoming combustible mixtures to below their flammability limits. Sufficient additional fuel to render the mixture flammable again may subsequently be added downstream.

The incinerator of the present invention is also able to burn oil mists that are generally non-combustible in other units, such as fluorinated oils used in vacuum pumps. Such vacuum pump oil mists tend to interact with silanes, halogens and other related compounds which are present in the pump exhaust. If the oil mists are not burned, these chemical interactions can lead to formation of hazardous solid materials in plant ductwork including cumulative deposition of certain explosive polymers. This problem is eliminated by the incinerator of the present invention, which is capable of burning such oil mists before they create a potential hazard.

Finally, another object of the present invention is to provide a unit with low maintenance requirements.

These and other objectives are fulfilled by the incinerator of the present invention.

SUMMARY OF THE INVENTION

Thus, in accordance with one aspect of the present invention, there is provided a device for oxidizing gaseous materials, comprising a combustion chamber, wherein the device and the combustion chamber both have a top and a bottom, the device further having a gas outlet and being adapted to operate in conjunction with means applying negative pressure to the outlet, means for introducing process gas and a source of fuel into the top of the combustion chamber, means for effecting heat exchange between oxygen-containing gas and the combustion chamber to preheat the oxygen-containing gas, means for introducing the preheated gas into the top of the combustion chamber, means for mixing the preheated gas with the process gas and fuel so that the mixture can burn in the combustion chamber to form an exhaust gas, an optional flame holder in the combustion chamber for holding a flame generated by the burning mixture, means for permitting the exhaust gas to exit from the bottom of the combustion chamber, and means for diluting and cooling the exhaust gas with air to form a flue gas, and for directing the flue gas from the bottom of the combustion chamber out of the outlet of the device, either below the combustion chamber, or above it, after permitting the flue gas to pass upwardly in the device outside of the combustion chamber.

In accordance with another aspect of the present invention, there is provided a device for oxidizing gaseous materials, wherein the means for introducing process gas and a source of fuel into the top of the combustion chamber is located sufficiently below the top of the combustion chamber that solid combustion byproducts do not substantially deposit in the combustion chamber above the means for introducing process gas. In another variation, the means for introducing fuel may comprise one or more sonic jets.

In another embodiment, the device further has means for introducing oxygen carrying gas into the top of the combustion chamber, means for mixing the oxygen carrying gas with the process gas and fuel so that the mixture can burn in the combustion chamber to form an exhaust gas, means for permitting the exhaust gas to exit from the bottom of the combustion chamber, and means for diluting and cooling the exhaust gas with air and for directing the resulting gas out of the outlet of the device.

In yet another embodiment, the device further comprises means in the combustion chamber for directing the mixture as it is burning outward toward the wall of the combustion chamber. In one variation, the mixture is directed radially outwardly toward the wall of the combustion chamber. In a preferred embodiment, the mixture directing means has a conical configuration and has an apex at the top thereof.

In a preferred embodiment, the device includes means for mixing oxygen carrying gas with process gas and fuel which means may advantageously include a first swirling means for swirling the oxygen-containing gas prior to its swirling entry into the combustion chamber, and may also include a second swirling means for swirling the process gas and/or the fuel in a direction opposite to the swirl of the oxygen-containing gas when the oxygen-containing gas enters the mixing area. In one preferred embodiment, the swirling means are adapted to swirl the fuel and the oxygen-containing gas in a manner so that when the swirling gases are combined, turbulent mixing occurs with cancellation of most or all of the swirling. The second swirling means may advantageously swirl both the fuel and the process gas prior to their contact with the preheated oxygen-containing gas. Moreover, the second swirling means may advantageously comprise one or more gas jets impinging on the process gas and the fuel.

Another variation of the device further comprises a mechanical scraper for removing solid products of reaction from the mixture directing cone and from the walls of the combustion chamber. A further variation comprises an additional mechanical scraper for removing solid products of combustion from the process gas/fuel inlet and mixing means. In another embodiment, the mechanical scraper for removing solid products of reaction from the process gas/fuel inlet and mixing means comprises one or more extensible blades which are spring loaded to extend radially outward. In addition, means may be provided for intermittently advancing and retracting the scraper; further, these means may simultaneously rotate the scraper.

In order to minimize maintenance due to accumulations of solids, the device may include a removable tray beneath the flame holder for collecting solid products of combustion. Additionally, the device may have gas jets for blasting accumulated particulate material from strategic areas inside the incinerator. The device may further include means in the combustion chamber above the flame holder for directing the mixture toward the outside of the combustion chamber prior to its contact with the flame holder. These means may have a conical configuration with the apex at the top.

Moreover, in another preferred embodiment, the device includes means for mixing cooling air from outside of the device with the exhaust gas after the exhaust gas has exited the combustion chamber. In order to provide a safe temperature at the outer wall of the device, it may further include a jacket spaced inside of the outer wall of the device, wherein the device is adapted to permit cooling air from outside the device to flow through the space inside the wall. This same air may then be mixed with the flue gas.

In another advantageous variation of the device, the heat exchanger contains the oxygen-carrying gas concentrically outside of the combustion chamber and concentrically inside the upwardly-moving flue gas. Preferably, the heat exchanger is adapted to heat the oxygen-carrying gas to a sufficient temperature that when it is mixed with the process gas and the fuel, the mixture is near or above its autoignition temperature. In order to facilitate ignition during start up and to assure smooth relight should a flameout condition occur, the device may include an igniter/pilot in the combustion chamber for igniting the mixture. In another variation, the heat exchanger is adapted to direct the oxygen-containing gas upwardly in thermal contact with the combustion chamber and into the top of the combustion chamber. In another aspect of the device, the heat exchanger directs the oxygen-containing gas upwardly over the outside of the combustion chamber.

In accordance with another aspect of the present invention, there is provided a device for oxidizing gaseous materials, comprising a combustion chamber, the device and the combustion chamber having a top and a bottom and a vertical axis, a preheater chamber located radially outside of the combustion chamber adapted to preheat oxygen-containing gas, a mixing zone at the top of the combustion chamber, means for introducing oxygen-containing gas from the preheater, fuel, and impurity-containing process gas into the mixing zone, a first swirler for swirling the oxygen-carrying gas entering the mixing zone in a first direction, a second swirler for swirling the fuel and process gas entering the mixing zone in a second direction, and an exit at the bottom of the combustion chamber through which exhaust can exit the chamber. The device may also include a means for diluting the exhaust with air and for directing the resulting gas out of the incinerator below the combustion chamber. The device may also include means for removing accumulations of particulate products of combustion from the incinerator.

Furthermore, the device may advantageously include a vertical flue located concentrically outside of the preheater chamber for directing the flue gas exiting the chamber upward and out of the top of the device. Furthermore, the device may advantageously include a removable tray below the combustion chamber for collecting solid combustion products. The device may also include a flame holder in the combustion chamber below the mixing zone. The flame holder may have vanes to cancel out any remaining swirl in the combustion mixture.

In another embodiment, the device may also include means for cooling the exhaust gas via mixing it with cooling air. The device may also include one or more conduits supplying process gas into the chamber, and means for introducing sufficient nonflammable gas into each conduit to raise the flow rate of gas in the conduit above the flame propagation speed for the gas in the conduit. Another embodiment further comprises means for cooling the conduit via directing the path of a gas over the outer surface of the conduit. In another variation, better results are usually obtained by interposing in the combustion chamber between the mixing zone and the flame holder a means for directing the mixture radially outwardly.

In another aspect of the invention, the removing means comprise mechanical scrapers movable inside the combustion chamber and inlet means in contact with the surfaces within these means.

In accordance with yet another aspect of the present invention, there is provided a method for oxidizing materials in a gas stream, comprising the steps of introducing fuel and process gas into a mixing zone, introducing preheated oxygen-carrying gas into the mixing zone and mixing it with the fuel and process gas to form a preheated mixture that contains sufficient oxygen to completely oxidize the fuel and any oxidizable impurities in the process gas, creating a burning mixture, directing the burning mixture downwardly through a combustion chamber and forming an exhaust gas which exits the combustion chamber, and preheating the oxygen carrying gas prior to its entry into the mixing zone with heat from the oxidation of the fuel. The method also advantageously includes the step of passing the burning mixture through a flame holder in the combustion chamber in which the oxidation of the fuel and the process gas is substantially completed. The preheating step advantageously comprises passing the oxygen-carrying gas upward over the outside of the hot combustion chamber. Furthermore, the mixing step advantageously comprises swirling the preheated gas entering the mixing zone in a first direction and swirling the fuel and process gas entering the mixing zone in a second, opposite direction, so that turbulent mixing occurs when the swirling gases collide. A preferred method may also include the step wherein one of the swirling gases is introduced into the mixing zone radially inwardly of another of the swirling gases. Preferably, the gas is introduced at a point sufficiently below the top of the combustion chamber that solid products of combustion do not accumulate on the inner surface of the top. Alternatively, the method further comprises the step of cooling the flue gas by mixing it with cooling air. In another embodiment, the method further comprises the step of preventing flashback into a conduit supplying process gas into the combustion chamber by reducing the cross sectional area of the conduit and by introducing sufficient nonflammable gas into the conduit upstream of the chamber so that the flow rate of gas in the conduit is greater than the flame propagation speed in the resulting gas mixture.

The method also may include the step of cooling the exhaust gas by mixing it with cooling air, and then directing the resulting cooled flue gas through a particulate removal device, such as a wet cyclone or a filter for removal of entrained solids, and optionally through a scrubber.

Finally, to the extent the specification does not fully describe the embodiments disclosed herein, all disclosures set forth in application Ser. Nos. 486,617, 355,987 and 336,718, of which this application is a continuation-in-part, are hereby incorporated by reference.

DETAILED DESCRIPTION OF THE INVENTION

There are three important embodiments of the present invention that are illustrated in the Figures. The first, shown in FIGS. 1-5, is the preferred embodiment. It is particularly designed to handle particulate combustion by-products, including those materials that tend to accumulate and/or adhere to burner components.

Figure 6:
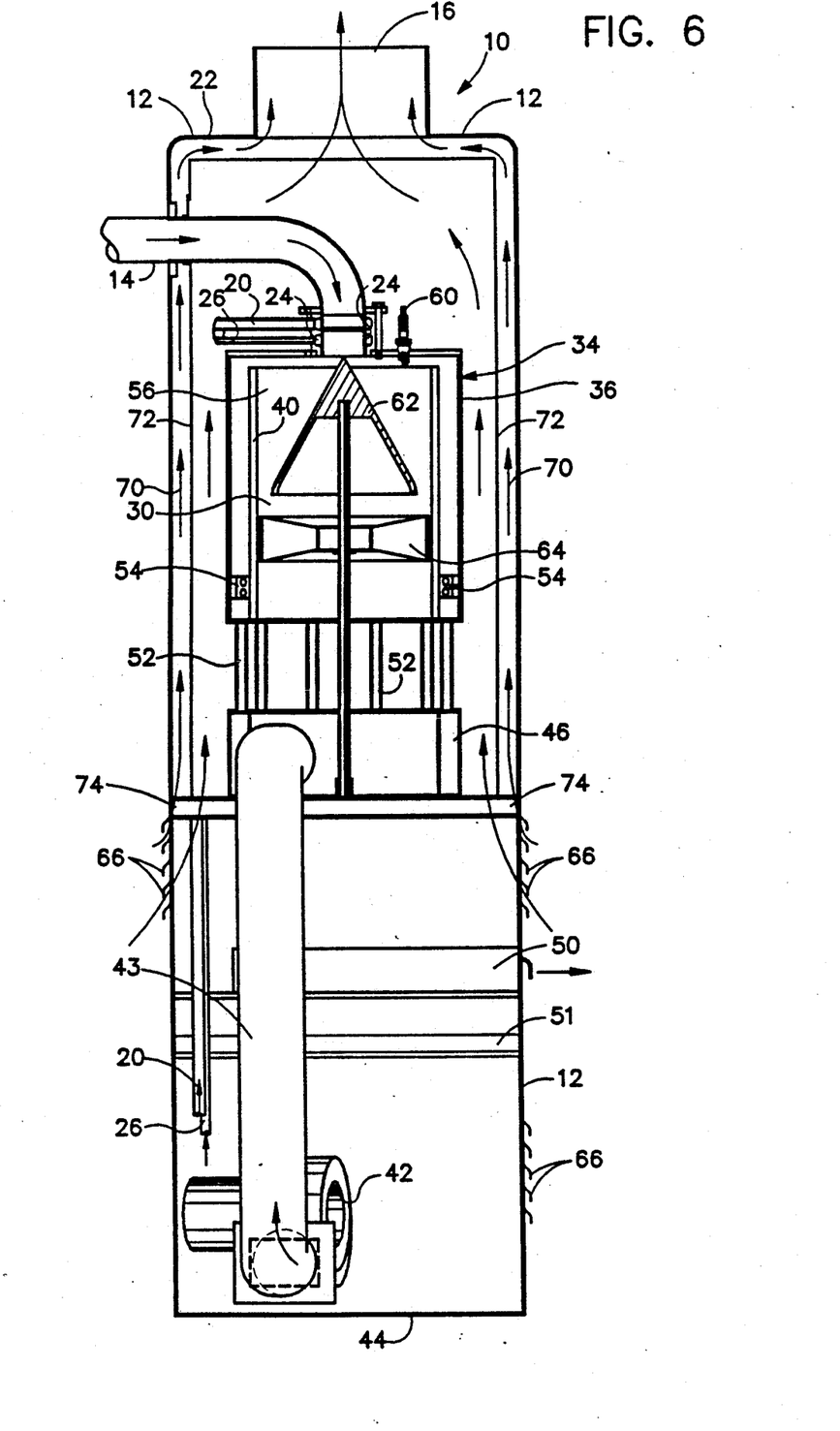
FIG. 6 is a cross section of another embodiment taken in the same manner as the cross section of FIG. 2.
Figure 7:
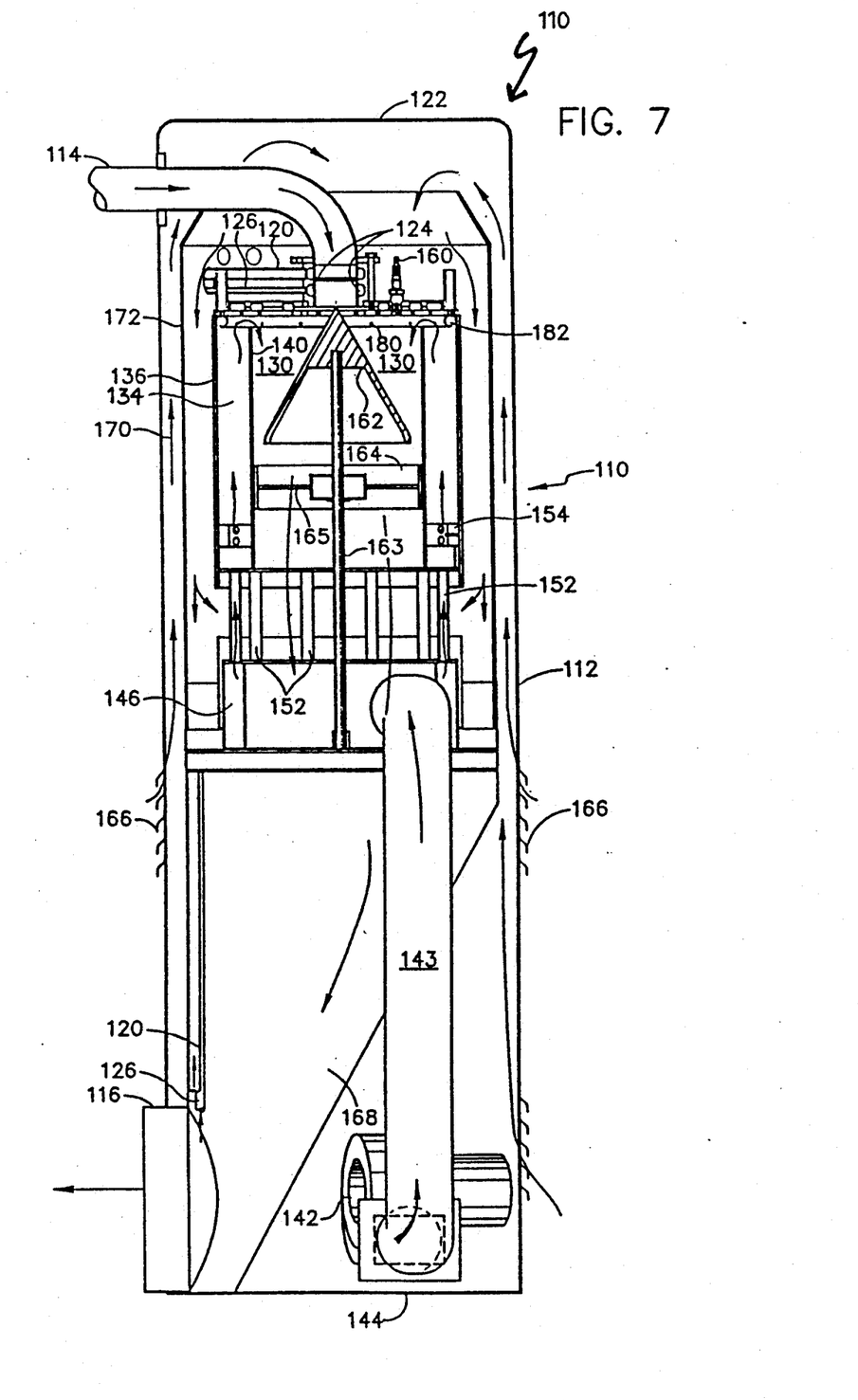
FIG. 7 is a cross section of another embodiment taken in the same manner as the cross section of FIG. 2.

The first alternative embodiment shown in FIG. 6 is an updraft system suitable for use when particulate combustion by-products are minimal or are of such a nature that buildup on internal components is not a problem. The second alternative embodiment shown in FIG. 7 is designed to handle lightweight particulate combustion by-products, including those materials that tend to accumulate on burner components, but which may be dislodged by gas jet pulses.

The preferred embodiment of the present invention is illustrated in the Figures, especially FIGS. 1-5. Shown in FIGS. 1-5 is an updraft system suitable for use in handling particulate combustion by-products, including those materials that tend to accumulate and adhere to burner components. When viewing the Figures, it should be noted that like-numbered apparatus elements therein are the same.

Figure 1:
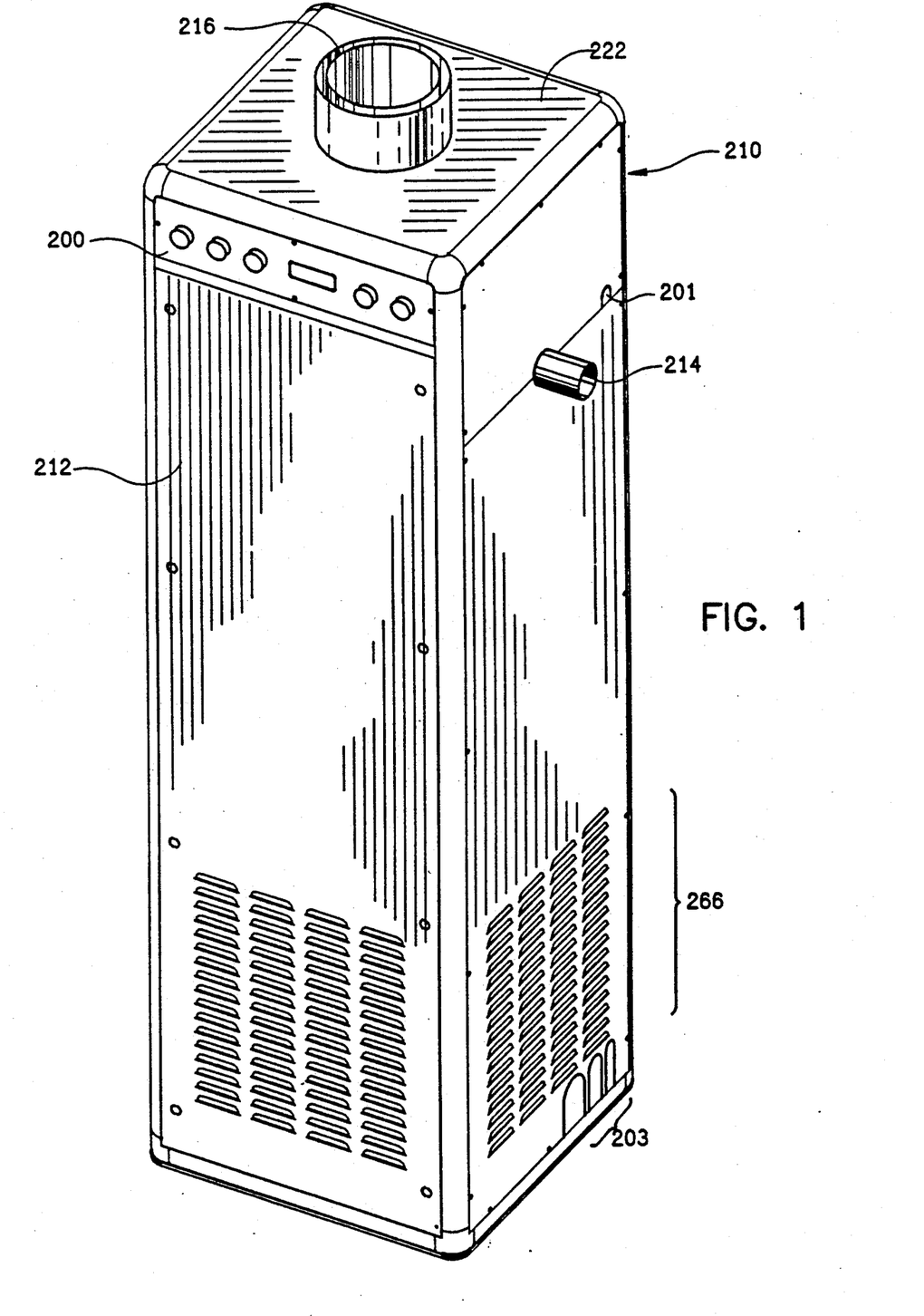
FIG. 1 is a perspective view of the incinerator of the present invention.
Figures 2, 3, 4:
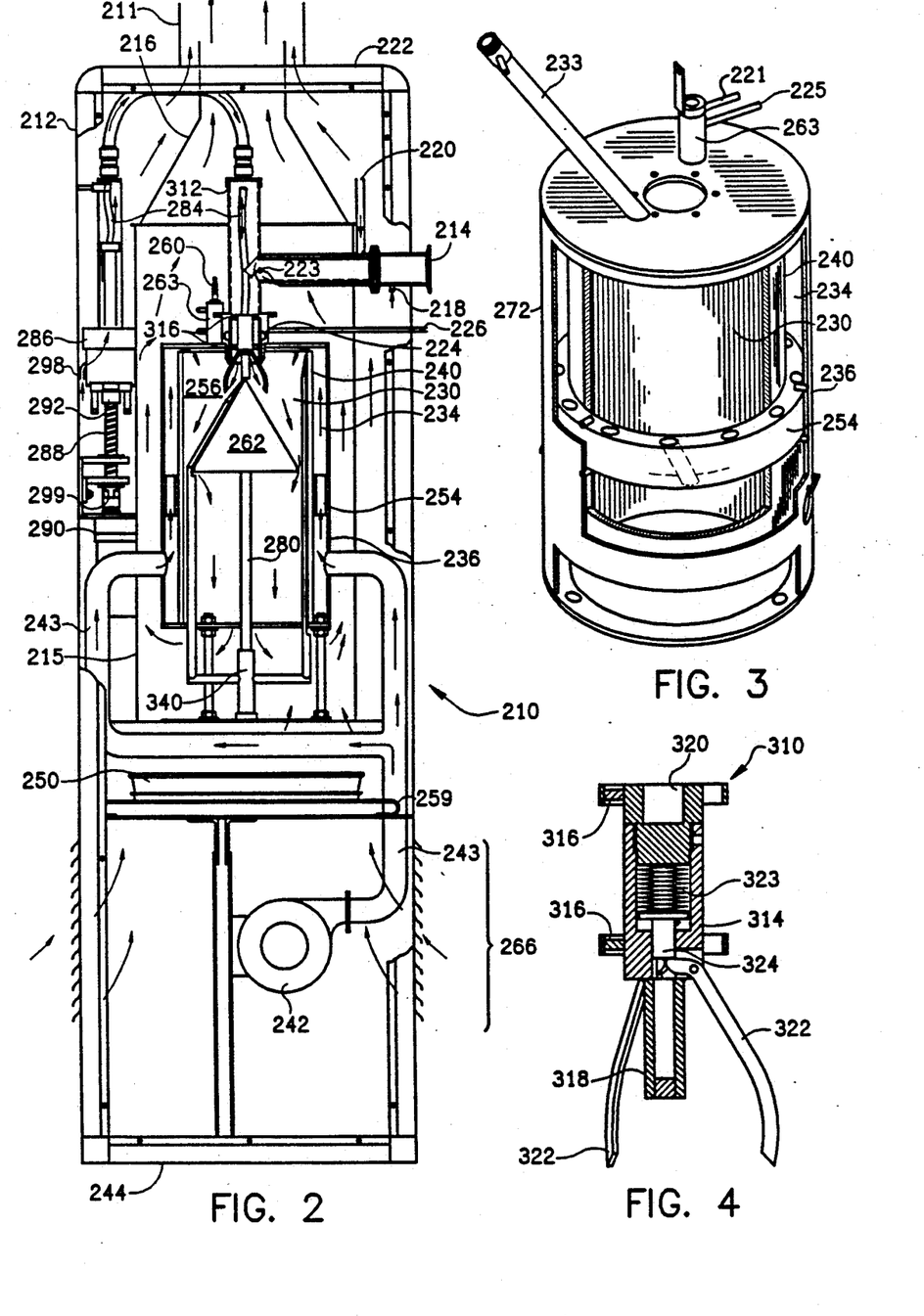
FIG. 2 is a cross section of the preferred embodiment.
FIG. 3 is a perspective cut-away view of a combustion chamber/preheater assembly.
FIG. 4 is an enlarged cross sectional view of an inlet/nozzle scraper.

With reference to FIGS. 1 and 2, the incinerator 210 of the present invention is preferably a vertically oriented device, having a housing 212, a process gas inlet 214, and a flue gas outlet 216. The housing 212 may further contain an aperture 201 through which a pneumatically activated bypass valve (not shown) is connected to a compressed gas line within housing 212, and apertures 203 for the attachment of incoming fuel gas, pressurized gases and electrical lines (not shown) to appropriate structures contained within the housing 212. Control panel 200 may advantageously contain various on/off and reset buttons, status lights and a display window providing operating parameter information, next step instructions and fault diagnostic messages as appropriate. Louvers 266 provide access for cooling air to enter housing 212.

In operation, process gas containing oxidizable impurities is introduced into the incinerator 210 through one or more process gas inlets 214, where it is combined with fuel gas (such as natural gas) entering the fuel gas inlet 220 (shown in FIG. 2) and with combustion air or other oxygen-containing gas, and is oxidized, generating an exhaust. After dilution of the exhaust with air, a flue gas is formed which exits the housing 212 of the incinerator 210 through the flue gas outlet 216, which is preferably situated at the top 222 of the incinerator 210.

The preferred embodiment illustrated in FIGS. 2-5 includes a number of features that facilitate operation when treating materials that generate particulate by-products and includes features which remove such particulates from interior surfaces of the incinerator.

With reference to FIG. 2, the general design of the incinerator 210 of the preferred embodiment is illustrated. In this design, the incinerator 210 has a housing 212 and a process gas inlet 214 substantially similar to those of FIG. 1. Within the housing 212 is contained a combustion chamber 230. Exhaust gases leaving the combustion chamber 230 of this embodiment of the incinerator 210 exit at a flue gas outlet 216.

In most instances, the incinerator 210 is also provided with a pilot light chamber 263. Process gas containing oxidizable impurities is introduced into the incinerator 210 through a process gas inlet 214, where it is combined with fuel gas (such as natural gas) entering the fuel gas inlet 220 and with combustion air or other oxygen-containing gas, and is oxidized, generating an exhaust. After dilution of the exhaust with air, a flue gas is formed which exits the housing 212 of the incinerator 210 through the flue gas outlet 216 located on top of flue gas plenum 215.

In operation, process gas containing impurities enters the housing 212 through the process gas inlet 214. This inlet 214 preferably carries the process gas radially inward to the central axis of the incinerator 210, which runs vertically through the center of the incinerator 210. The process gas inlet 214 then directs the process gas downwardly along the central axis of the incinerator 210. At this point, fuel gas enters through fuel gas inlet hole(s) 223 and is mixed with the process gas. The path of fuel gas from inlet 220 to inlet hole(s) 223 may be directed by a jacket over the outer surface of the process gas inlet 214 thereby providing convective cooling to the inside wall of process gas inlet 214. Any other gas such as nitrogen or air may be used for the cooling, and the fuel gas may be introduced at any convenient location into the vertical section of process gas inlet 214. Additionally, nitrogen for flashback protection may be introduced into the process gas inlet 214 through inlet 218. A total gas flow above 1 scfm in inlet 214 will exceed the flame propagation speed at ordinary temperatures for most combustible mixtures except those containing premixed hydrogen and oxidizer.

The downwardly directed mixture of fuel and process gas is further thoroughly mixed with air as it enters combustion chamber 230. This mixing is preferably accomplished by means of a ring nozzle which is represented in FIG. 2 as element 224. A sight tube 233 (shown in FIG. 3) for attachment of a UV detector is located at the top of combustion chamber 230 adjacent to ring nozzle 224. The UV detector (not shown) functions as a control system to monitor the presence of flame within the combustion chamber. In one embodiment, the ring nozzle 224 is also connected to a pressurized gas line 226 which imparts a swirl to the combined fuel gas and process gas. The ring nozzle 224 is advantageously an annular nozzle surrounding the pathway of the process gas as it leaves the process gas inlet 214 in a downward direction along the vertical axis of the incinerator 210. The ring nozzle 224 may comprise a plurality of sonic jets directing air or other pressurized gas around and into the process gas to effect mixing of the process gas, the fuel gas, and the air from the ring nozzle 224. To the extent that any combustion is occurring at the ring nozzle 224, the high velocity within the sonic air jets (which will also function effectively when subsonic) prevents plugging of the jet orifices. Such plugging might otherwise occur through reaction between the injected oxygen and silane in the process gas to form solid reaction products in the jets. It is preferred that the sonic jets are directed not only in a spiral direction, but also are canted downward. This tends to draw the process gas into the combustion chamber 230, with the sonic jets acting as an ejector pump, preventing back pressure from being exerted on the process gas inlet line 214. The ring nozzle 224 preferably injects air through orifices distributed all the way around the process gas inlet 214.

The mixture of fuel gas and process gas exiting the ring nozzle 224 travels downward into a combustion chamber 230 located vertically below the ring nozzle 224 along the vertical axis of the incinerator 210. There the fuel gas and process gases are combined with combustion air that has been preheated by means of a heat exchanger 234. The heat exchanger 234 in the illustrated embodiment comprises a jacket 236 located radially outwardly from and circumferentially surrounding the outer wall 240 of the combustion chamber 230. The combustion air is preferably directed into the heat exchanger 234 by means of a fan 242, which is preferably located at the bottom 244 of the incinerator 210. The fan 242 pushes outside air up through a bifurcated air pipe 243 into the heat exchanger 234. The combustion air leaves the pipe 243 and travels into the heat exchanger 234, which is preferably annular in cross section The air then moves upward through a swirl inducing ring 254 in the heat exchanger 234. The swirling air then reverses its upward component of direction 180 degrees as it enters the top of the combustion chamber 230. Turbulent mixing of the preheated combustion air and the fuel gas and process gas occurs in a mixing zone 256 in the top of the combustion chamber 230. The hot combustion air entering the mixing zone is swirling in the opposite direction of the fuel/process gas stream stirred by the sonic mixing jets, and the relative angular momentums of the swirling streams are such that little or no swirling is present in the downwardly-traveling gas mixture within and exiting the combustion zone. Particulate matter exiting the bottom of the combustion chamber 230 is normally entrained in the upwardly moving cooling flow within flue gas plenum 215. Any dense material falling out of the air flow is collected in a catch tray 250 located beneath the combustion chamber and supported atop base support 259. The various support mechanisms beneath the combustion chamber 230 are of an open construction to allow cooling air to pass upwardly past them and past catch tray 250 into flue gas plenum 215.

During startup of the incinerator, and as otherwise needed, an igniter 260 (which can be a conventional spark plug) is used to ignite an air/fuel gas mixture created within pilot chamber 263 to produce a continuous pilot flame extending from pilot chamber 263 into the combustion chamber 230. (Pilot air inlet 221 and pilot fuel gas inlet 225 are shown in FIG. 3). The pilot flame assures ignition of the process gas/fuel/air mixture present within the combustion chamber and is located on the blind side of the optical path provided by sight tube 233 for the UV detector This insures that the UV detector will see no flame should the main combustion flame extinguish but the pilot flame continue to burn.

Located just below the mixing zone 256 in the top of the combustion chamber 230 is a flow director 262 supported by a fixed rod 280. The flow director 262 urges the downwardly-moving burning gas leaving the mixing zone 256 in a radially outward direction. The flow director 262 may advantageously be conical in configuration, as illustrated in FIG. 2, with its apex located in mixing zone 256 and situated symmetrically about the vertical axis of the incinerator 210.

The exhaust gas generated by the combustion process exits down and out of the combustion chamber 230. The gas then reverses direction 180 degrees as it is entrained in and mixes turbulently with a large volume of cooling air drawn upwardly through flue gas plenum 215. In one preferred embodiment, the incinerator is adapted to operate with negative pressure applied to the flue gas outlet. This negative pressure, for example, is applied to the ductwork into which the flue gas travels as it leaves the incinerator 210 by a conventional scrubber or other device. Such negative pressure may be used to cool the exhaust gas by drawing outside cooling air into the incinerator through louvers 266 on the housing 212 of the incinerator 210. These louvers 266 are preferably located below the combustion chamber 230. Convective cooling of the housing 212 is assured by the provision for a gap between collar 211 (attached to the external ducting) and the smaller concentric cylindrical portion of flue gas outlet 216, in that some of the cooling air also flows through this gap and must reach it from below by moving upwardly through the space between the inside surfaces of housing 212 and the outer surface of flue gas plenum 215. As a result, the outer housing 212 of the incinerator 210 remains cool. In addition, the continuous flow of air through this gap prevents any accumulation of undesirable gas inside the upper portions of housing 212 should any internal leaks occur.

Figure 5:
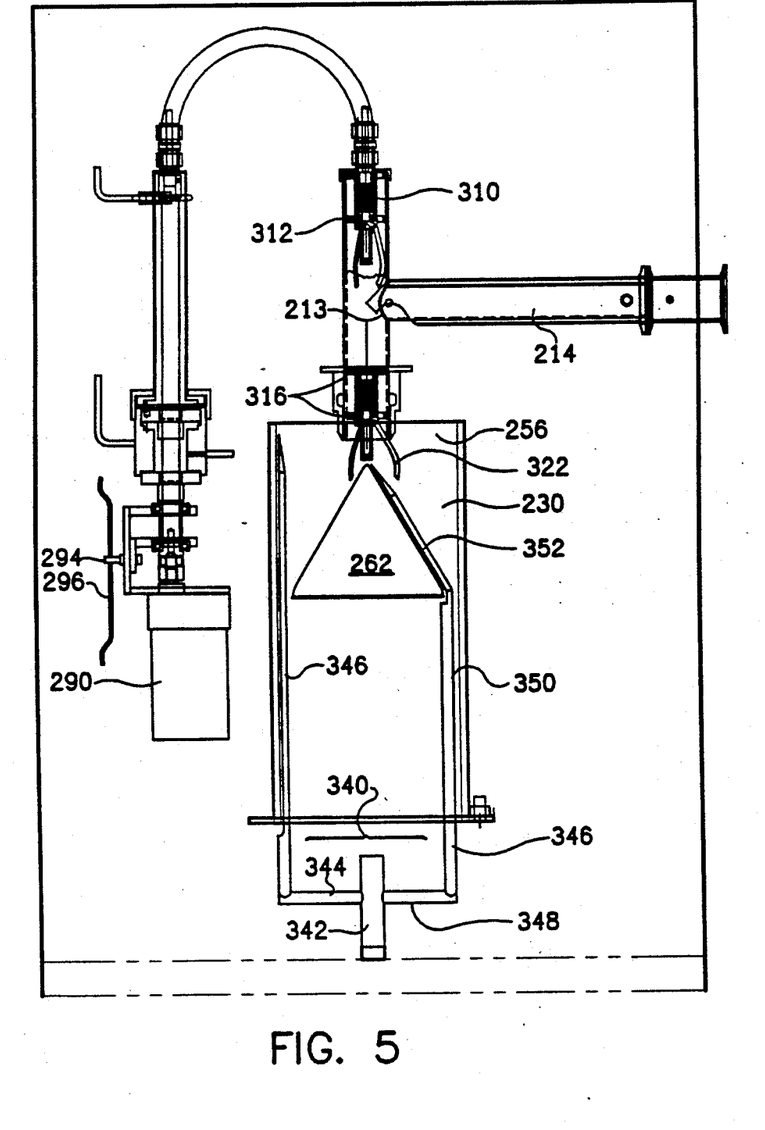
FIG. 5 is an enlarged cross sectional view of an inlet/nozzle scraper assembly and a chamber scraper assembly, taken in the same manner as the cross section of FIG. 2

Another aspect of the preferred embodiment of the incinerator 210 that is particularly significant is the provision of scrapers for removal of particulates from interior surfaces of the incinerator. As illustrated in FIGS. 4 and 5, there is a first scraper, inlet/nozzle scraper 310, located within tube 312 (see esp. FIG. 5). This inlet/nozzle scraper 310, as shown in FIG. 4, comprises a body 314, two centering rings 316 located annularly over the body 314 for maintaining it centered within the tube 312, a lower post 318 extending downwardly from the body 314, and a cap 320 threaded into the top of the body 314 and compressing a spring 323 inside of the body 314, which in turn biases a piston 324 downwardly. The piston 324 extends through the center of the body 314 to the bottom thereof. Inlet/nozzle scraper 310 further comprises one or more extensible scraper blades 322 extending vertically downward and radially outward from the body 314, which are spring loaded to extend radially outward against the inside of the tube 312 by means of compressed spring 323 and piston 324. In the illustrated embodiment, multiple blades 322 are shown, albeit it is to be understood that the number of blades may vary without altering the spirit and scope of the invention. Post 318 is provided to dislodge accumulated particulate material at the top of the flow director 262. At cap 320, inlet/nozzle scraper 310 is attached to a lead screw/flexible drive device used for rotating, raising and lowering the inlet/nozzle scraper 310 up and down within tube 312, as shown in FIGS. 2 and 5. FIG. 5 shows the two typical extreme positions of movable inlet/nozzle scraper 310.

The rotating, raising and lowering of inlet/nozzle scraper 310 is accomplished as follows (please refer to FIGS. 2 and 5): a flexible drive cable 284 is attached to inlet/nozzle scraper 310 at one end and to a lead screw drive mechanism 299 at the other end. A fixed body 286 houses a nut through which the lead screw 288 turns when rotated by a reversing drive motor 290. As the lead screw 288 advances through fixed nut 292 it simultaneously rotates and advances flexible drive cable 284 which is attached firmly to the end of the lead screw 288. Attached firmly to the other end of drive cable 284 is the inlet/nozzle scraper 310 which then rotates and advances with the drive cable. Drive motor 290 is mounted on the lower end of the lead screw and advances with it. Additionally, a small flow of inert or non-reactive gas such as nitrogen is introduced into the fixed body 286 through inlet 298 in order to purge the drive cable conduit and keep it free of reactive or corrosive process gases. This purge gas enters tube 312 at the top and flows past the parked inlet/nozzle scraper 310 thereby cooling it, keeping its guide rings 316 open and preventing process gas from entering the portion of tube 312 above the plane of the process gas inlet 214. This upper portion of tube 312 in which the scraper resides most of the time is unavoidably heated by radiation from the hot combustion chamber.

FIG. 5 indicates how the drive motor housing and mounting are constrained from rotating by guide rods 294 which slide along a vertical guide bar 296 as the motor advances up or down with the rotating lead screw. Reversal of rotation and of advancement direction takes place when electrical limit switches are tripped at the ends of the travel and the motor 290 is reversed.

As rotating inlet/nozzle scraper 310 advances downward through tube 312 and past the mouth 213 of the process gas inlet tube 214 it dislodges deposited solids from the inner wall of the tube, thereby preventing gradual buildup of solids and eventual plugging of inlet mouth 213, tube 312 or ring nozzle 224. As the inlet/nozzle scraper 310 continues to move down, extensible blades 322 are biased in such a manner that, when they are extended beyond the ring nozzle 224, they are able to open up radially outwardly and scrape particulate material lying very near to the sonic mixing jets (not shown) of the ring nozzle 224. This is necessary to preserve good mixing in mixing zone 256 where any physical interference between the incoming process gas/fuel mixture and the mixing jets can significantly degrade performance. When inlet/nozzle scraper 310 is withdrawn back into tube 312, blades 322, due to their biasing, may easily be drawn back into ring nozzle 224 and tube 312. An inlet/nozzle scraping cycle is completed when the scraper returns to its parking position at the top of the tube 312 where it resides above the inlet gas flow. One cycle, from top to nozzle and back again, takes about forty seconds to complete. The cycle may be repeated as often as desired, typically once every half hour.

A second, or chamber, scraper 340 is positioned within combustion chamber 230 and, as shown in FIGS. 2 and 5, comprises a center support bearing 342 located on the central axis of the combustion chamber 230 below the bottom of said chamber; a long radially extending support spoke 344 connected to the bearing 342 which supports a long upright scraper blade 346 extending vertically into the combustion chamber 230 against the inside wall thereof, preferably extending from bottom to top; a short radially extending support spoke 348 connected to the bearing 342 which supports the bottom end of a short upright bar 350, which is further connected at its top end at an angle of about 60° to a scraper blade 352 extending vertically along the outside of the conical flow director 262. Center support bearing 342 is rotatably attached at its lower end to a chain drive mechanism (not shown), distal to the central pivotal axis. Bearing 342 is fitted with a sprocket connected by a drive chain to a sprocket on a motor located below motor 290. This chamber scraper motor runs continuously and turns chamber scraper 340 slowly at several revolutions per minute.

During the operation of the incinerator of the preferred embodiment, the inlet/nozzle scraper 310 and the chamber scraper 340 function to remove particulate materials from within the combustion chamber 230. As noted previously, the inlet/nozzle scraper 310 removes particulates from within the tube 312, from the jets of the ring nozzle 224, and from the apex of the flow director 262. Additionally, scraper blades 346 and 352 rotate continuously. Scraper blade 346 removes particulates from the interior cylindrical wall of the combustion chamber 230, while scraper blade 352 removes particulates from the conical surface of the flow director 262. As particulates are dislodged, they drift out the bottom of chamber 230 and are either entrained into the upwardly moving cooling air within plenum 215 or else fall out of the flow and into catch tray 250. As illustrated in the Figures, in the preferred embodiment, the chamber scraper support and drive apparatus, i.e., the spokes, chain, bearing and motor, are located below the combustion chamber and flow reversal plane as characterized by the arrows indicating direction of gas flow, in order to avoid excessive heating or fouling with particulates, and to minimize intrusion into the combustion chamber of mechanical surfaces which can provide a foothold for particulate deposition leading to eventual blockage of the chamber exit.

During the operation of a typical incinerator 210 having one or more 2-inch process gas inlets 214 and a combustion chamber volume of ⅛ cubic foot, process gases comprising 0-3 scfm $N_2$ with 0-10 scfm $H_2$ and smaller amounts of oxidizable impurities such as arsine, silane, phosphine, diborane and halogenated hydrocarbons are combined with sufficient natural gas or other gaseous fuels to sustain combustion (typically from 0.5-2.5 scfm) Compressed air is introduced into the swirl nozzle 224 at a rate of from 0.5 to 3 scfm, 80 psig. The preheated air from the fan 242 enters the combustion zone at a rate of from about 10-40 scfm, at a preheated temperature of about 400 degrees C. The negative pressure applied to the flue gas outlet draws gas out of the incinerator at a rate of about 400-600 scfm.

The incinerator 210 houses a control system with electronic controls, plumbing, automatic valves, various sensors, power supplies and other appurtenances (not shown) generally located in the space below catch tray 250 and mounted to vertical panels in the manner illustrated by the mounting of fan 242. The controls are operated from control panel 200. The general nature and functions of the control system will be described briefly.

A microprocessor (such as an Intel 8051, Intel Corp., Santa Clara, Calif.) works in conjunction with a UV detector/controller (e.g., an Allen Bradley Fireye ®, Waltham, Mass.) to operate a number of normally closed solenoid valves, sensors, switches and the like, and to provide status information to the operator. Input gas pressures, operating temperatures, fan pressure, duct draw and natural gas back pressure are sensed and input to the microprocessor. Resident firmware performs a self test and turns on the UV detector/controller if all is well. If the UV detector/controller loses power or fails for any reason the spring loaded fuel gas valve closes, the combustion air fan stops, there is no spark, combustion ceases and the incinerator shuts down. The UV detector/controller has direct control of the essential safety functions (fuel, air, ignition). If the UV detector/controller shuts the system down it cannot be restarted by the microprocessor until the UV controller has been reset manually. The microprocessor prompts the operator that the manual reset is needed and tells when pressing the reset button is likely to be successful. Alternatively, if any of the inputs to the microprocessor indicate a fault, the firmware can instruct the UV detector/controller to shut the system down and the microprocessor can simultaneously take action to notify the operator about the nature of the specific problem and what to do next. For example, if an internal blockage were to restrict the entrance of natural gas into the combustor, the back pressure would begin to rise. Long before the back pressure approaches the line pressure, the back pressure switch will trip and the natural gas valve will close, thereby protecting the gas line from possible back streaming. The microprocessor will sound an audible alarm and place the message "fuel pressure low" in the display window along with instructions about the next action to be taken. Simultaneously the UV detector will sense a flame out condition and its controller will shut the incinerator down. If chamber or exhaust temperatures exceed preset limits during operation, the microprocessor will instruct the UV controller to shut the system down. If any compressed gas pressure falls below its preset limit the microprocessor will close the valve for that gas and similarly call for system shut down. In all such cases the operator is provided with an interlock signal which can be used to automatically shut down his process or, alternatively, the control system will switch a compressed gas solenoid to actuate a pneumatic valve in order to divert the process gas into another operating unit (valve normally diverted). In the event of a scraper failure the microprocessor sounds the alarm and indicates which scraper is out but does not divert the flow or shut down the process, since there is little immediate danger and there is a high probability that the batch can be completed successfully before plugging of the incinerator becomes severe.

With reference to FIG. 6, in the first alternative embodiment, the incinerator 10 is preferably a vertically oriented device, having a housing 12, a process gas inlet 14, and a flue gas outlet 16. The incinerator 10 is also provided with a fuel inlet 20. In operation, process gas containing oxidizable impurities is introduced into the incinerator 10 through the process gas inlet 14, where it is combined with fuel gas (such as natural gas) entering the fuel inlet 20 and with combustion air or other oxygen-containing gas, and is oxidized, generating an exhaust gas. The exhaust gas is diluted with air to form a flue gas which exits the housing 12 of the incinerator 10 through the flue gas outlet 16, which is preferably situated at the top 22 of the incinerator 10.

The operation and internal construction of the incinerator 10 is similar to that of the preferred embodiment and can more readily be explained as follows. Process gas containing impurities enters the housing 12 through the process gas inlet 14. This inlet 14 preferably carries the process gas radially inward to the central axis of the incinerator 10, which runs vertically. The process gas inlet 14 then directs the process gas downwardly along the central axis of the incinerator 10. At this point, fuel gas enters through the fuel gas inlet 20 and is thoroughly mixed with the process gas. This mixing is preferably accomplished by means of a ring nozzle which is schematically represented in FIG. 6 as element 24. In one embodiment, the ring nozzle 24 is also connected to a pressurized air line 26 which imparts a swirl to the combined fuel gas and process gas. The ring nozzle 24 is advantageously an annular nozzle surrounding the pathway of the process gas as it leaves the process gas inlet 14 in a downward direction along the vertical axis of the incinerator 10. The ring nozzle 24 may comprise a plurality of sonic jets directing air (and, optionally, fuel gas) around and into the process gas to effect mixing of the process gas, the fuel gas, and the air from the ring nozzle 24. To the extent that any combustion is occurring at the ring nozzle, the high velocity sonic air jets (which will also function effectively when subsonic) prevents plugging of the jets through reaction between the injected oxygen and silane in the process gas. It is preferred that the sonic jets are directed not only in a spiral direction, but also are canted downward. This tends to draw the process gas into the combustion chamber 30, with the sonic jets acting as an ejector pump, preventing back pressure from being exerted on the process gas inlet line 14. The ring nozzle 24 preferably injects air through slots all the way around the process gas inlet 14.

It should be pointed out that the quantity of air injected through the ring nozzle 24 is preferably substantially less than is required for stoichiometric combustion of the fuel gas/process gas mixture. In addition to mixing promoted by the jets, a small amount of initial burning of fuel before mixing with the main preheated air stream occurs, and this effectively preheats the fuel stream and initiates key reactions which make the final combustion process highly efficient. Moreover, with some flammable process gas streams a reduced quantity of fuel gas or even no fuel gas may be required.

The mixture of fuel gas and process gas exiting the ring nozzle 24 travels downward into a combustion chamber 30 located vertically below the ring nozzle 24 along the vertical axis of the incinerator 10. There the fuel gas and process gases are combined with combustion air that has been preheated by means of a heat exchanger 34. The heat exchanger 34 in the illustrated embodiment comprises a jacket 36 located radially outwardly from and circumferentially surrounding the outer wall 40 of the combustion chamber 30. Alternatively, of course, any equivalent means for preheating the combustion air utilizing the heat generated by the combustion occurring in the combustion chamber 30 may be used. Thus, for example, the heat exchanger 34 may direct the combustion air through a portion of the combustion chamber 30.

The combustion air is preferably directed into the heat exchanger 34 by means of a fan 42, which is preferably located at the bottom 44 of the incinerator 10. The fan 42 pushes outside air up through an air pipe 43 into a manifold 46 located below and spaced axially apart from the combustion chamber 30. The manifold 46 may be of annular construction, having a passageway roughly the same diameter as the combustion chamber 30 extending vertically therethrough. This passageway permits particulate material exiting the bottom of the combustion chamber to pass down through the manifold 46 to be collected in a catch tray 50, located below the manifold 46. A filter 51 may be interposed between the fan 42 and the catch tray 50 to prevent any escaping particulate materials from entering the fan inlet.

In one embodiment, the manifold 46 is connected to the heat exchanger 34 by vertically extending pipes 52 arranged radially around the axis of the incinerator 10. The pipes 52 are spaced apart so that flue gas exiting the combustion chamber 30 can pass radially outward between the pipes 52.

As the combustion air leaves the pipes 52 and travels vertically into the heat exchanger 34, which is preferably annular in cross section, it passes through a swirl ring 54 that causes the air to swirl inside the heat exchanger. The swirling air then moves upward through the heat exchanger 34 and reverses direction 180 degrees as it enters the top of the combustion chamber 30. Turbulent mixing of the preheated combustion air and the fuel gas and process gas occurs in a precombustion zone 56 in the top of the combustion chamber 30. The air entering the precombustion zone is swirling in the opposite direction of the fuel/process gas stream, and the relative angular momentums of the swirling streams are such that little or no swirling is present in the downwardly-traveling gas mixture exiting the precombustion zone 56.

During startup of the incinerator, and as otherwise needed, an igniter 60 (which can be a conventional spark plug) is used to ignite the air/fuel/process gas mixture. During normal operation of the incinerator, however, the temperature of the preheated combustion air is sufficiently high that the mixture in the precombustion zone 56 is above its autoignition temperature, so that it spontaneously ignites and burns. (In some embodiments, the mixture is about at its autoignition temperature, and can be below the autoignition temperature.) Nevertheless, the presence of an igniter which operates continuously can serve to smooth out restarts when flameout transients occur through sudden inlet of excessively high flows of inert gas.

Located in the precombustion zone 56 in the top of the combustion chamber 30 is a flow director 62 that urges the downwardly-moving burning gas leaving the precombustion zone 56 in a radially outward direction. The flow director 62 may advantageously be conical in configuration, as illustrated in FIG. 6, with its apex located at the top of the combustion chamber 30 and situated symmetrically about the vertical axis of the incinerator 10.

Located below the flow director in the combustion chamber 30 is a flame holder 64. The flame holder 64 may comprise a set of vertically-oriented vanes, or may comprise any other configuration for containing the flame and insuring that complete oxidation of all impurities is accomplished before the exhaust gas exits the bottom of the combustion chamber 30. Thus, a mesh arrangement or other alternative configuration may be used for the flame holder 64. However, in the embodiment shown in FIG. 6, the flame holder 64 has vanes canted in the opposite direction of the swirling preheated air as it enters the combustion chamber 30. Typically, the angular momentum of the process gas/fuel gas mixture is not sufficient to completely cancel out the opposite angular momentum of the swirling preheated air. Indeed, some swirl in the precombustion zone 56 is desirable in order to permit the burning mixture to move toward and utilize the center of the combustion chamber 30 after the mixture passes the flow director 62. The vanes in the flame holder 64 can cancel that remaining swirl.

The bottom of the combustion chamber 30 is open, and the exhaust gas generated by the combustion process exits down out of the combustion chamber 30 and moves radially outwardly between the vertical pipes 52. The gas is then drawn upward, preferably outside of the heat exchanger 34. The gas exits the incinerator out of the flue gas outlet 16 at the top 22 of the incinerator.

In one preferred embodiment, the incinerator is adapted to operate with negative pressure applied to the flue gas outlet. This negative pressure, for example, is applied to the ductwork into which the flue gas travels as it leaves the incinerator 10 by a conventional scrubber. Such negative pressure may be used to cool the exhaust gas by drawing outside cooling air into the incinerator through louvers 66 on the housing 12 of the incinerator 10. These louvers are preferably located below the combustion chamber 30, so that cooling air is mixed with exhaust gas exiting the combustion chamber. Furthermore, in one preferred embodiment, a cooling jacket 70 is provided on the incinerator, which comprises a wall 72 spaced a small distance inside the housing 12, with a vertically extending gap between the housing 12 and the cooling jacket wall 72. This gap is open to the flue gas exit at the top and to outside air at the bottom, so that the outer housing 12 of the incinerator 10 remains relatively cool due to low thermal conductivity between the cooling jacket wall 72 and the outer housing 12, as well as the movement of cool air upward through the gap between the cooling jacket wall 72 and the housing 12.

The combustion chamber 30, the manifold 46, and the other internal components can be supported by crossed beams 74 extending radially inward under the manifold 46.

The incinerator 110 of the second alternative embodiment of the invention is generally similar to that of the first alternative embodiment, but includes a number of features that facilitate operation with materials that generate some particulate by-products which may be dislodged by gas jet pulses.

With reference to FIG. 7, the general design of the incinerator 110 of the second alternative embodiment of the invention is in many respects similar to that of the incinerator illustrated in FIGS. 1-5. Accordingly, the following discussion will illustrate the differences between those illustrated embodiments.

In this design, the incinerator 110 has a housing 112 and a process gas inlet 114 substantially similar to those of FIGS. 1-5. However, exhaust gases leaving the combustion chamber 130 of this embodiment of the incinerator 110 exit at a flue gas outlet 116 located on the side of the incinerator 110, below the combustion chamber 130.

The incinerator 110 is also provided with a fuel inlet 120. Process gas containing oxidizable impurities is introduced into the incinerator 110 through the process gas inlet 114 near the top 122 of the incinerator 110, where it is combined with fuel gas (such as natural gas) entering the fuel inlet 120 and with combustion air or other oxygen-containing gas, and is oxidized, generating an exhaust gas. The gas exits the housing 112 of the incinerator 110 through the flue gas outlet 116, which is situated below the combustion chamber.

In operation, process gas containing impurities enters the housing 112 through the process gas inlet 114. This inlet 114 preferably carries the process gas radially inward to the central axis of the incinerator 110, which runs vertically through the center of the incinerator 110. The process gas inlet 114 then directs the process gas downwardly along the central axis of the incinerator 110. At this point, fuel gas enters through the fuel gas inlet 120 and is thoroughly mixed with the process gas. This mixing is preferably accomplished by means of a ring nozzle which is represented in FIG. 7 as element 124. In one embodiment, the ring nozzle 124 is also connected to a pressurized air line 126 which imparts a swirl to the combined fuel gas and process gas. The ring nozzle 124 is advantageously an annular nozzle surrounding the pathway of the process gas as it leaves the process gas inlet 114 in a downward direction along the vertical axis of the incinerator 110. The ring nozzle 124 may comprise a plurality of sonic jets directing air (and, optionally, fuel gas) around and into the process gas to effect mixing of the process gas, the fuel gas, and the air from the ring nozzle 124. Moreover, the high velocity curtain provided by the ring nozzle 124 facilitates the prevention of flashback into the process gas inlet 114. To the extent that any combustion is occurring at the ring nozzle 124, the high velocity sonic air jets (which will also function effectively when subsonic) prevents plugging of the jets through reaction between the injected oxygen and silane in the process gas. It is preferred that the sonic jets are directed not only in a spiral direction, but also are canted downward. This tends to draw the process gas into the combustion chamber 130, with the sonic jets acting as an ejector pump, preventing back pressure from being exerted on the process gas inlet line 114. The ring nozzle 124 preferably injects air through a slit or slots all the way around the process gas inlet 114 in the same manner as in the embodiments of FIGS. 1-5.

The mixture of fuel gas and process gas exiting the ring nozzle 124 travels downward into a combustion chamber 130 located vertically below the ring nozzle 124 along the vertical axis of the incinerator 110. There the fuel gas and process gases are combined with combustion air that has been preheated by means of a heat exchanger 134. The heat exchanger 134 in the illustrated embodiment comprises a jacket 136 located radially outwardly from and circumferentially surrounding the outer wall 140 of the combustion chamber 130.

The combustion air is preferably directed into the heat exchanger 134 by means of a fan 142, which is preferably located at the bottom 144 of the incinerator 110. The fan 142 pushes outside air up through an air pipe 143 into a manifold 146 located below and spaced axially apart from the combustion chamber 130. The manifold 146 may be of annular construction, having a passageway roughly the same diameter as the combustion chamber 130 extending vertically therethrough. This passageway permits exhaust gases and particulate material exiting the bottom of the combustion chamber to pass down through the manifold 146 and out through the flue gas outlet 116 to be either exhausted or collected in conventional filtration equipment, in a wet cyclone, or in a scrubber.

In one embodiment, the manifold 146 is connected to the heat exchanger 134 by vertically extending pipes 152 arranged radially around the axis of the incinerator 110. The pipes 152 are spaced apart so that exhaust gas exiting the combustion chamber 130 can pass radially outward between the pipes 152. As the combustion air leaves the pipes 152 and travels vertically into the heat exchanger 134, which is preferably annular in cross section, it passes through a swirl ring 154 that causes the air to swirl inside the heat exchanger. The swirling air then moves upward through the heat exchanger 134 and reverses direction 180 degrees as it enters the top of the combustion chamber 130. Turbulent mixing of the preheated combustion air and the fuel gas and process gas occurs in the top of the combustion chamber 130. The air entering the combustion chamber 130 is swirling in the opposite direction of the fuel/process gas stream, and the relative angular momentums of the swirling streams are such that little or no swirling is present in the downwardly-traveling gas mixture exiting the combustion zone.

During startup of the incinerator, and as otherwise needed, an igniter 160 (which can be a conventional spark plug) is used to ignite the air/fuel/process gas mixture.

Located in the combustion zone in the top of the combustion chamber 130 is a flow director 162 supported by a rod 163. The flow director 162 urges the downwardly-moving burning gas leaving the combustion zone in a radially outward direction. The flow director 162 may advantageously be conical in configuration, as illustrated in FIG. 7, with its apex located at the top of the combustion zone and situated symmetrically about the vertical axis of the incinerator 110.

Located below the flow director 162 in the combustion chamber 130 and supported by the rod 163 is a locator ring 164 which extends around the inside of the outer wall 140 of the combustion chamber 130 and is located radially inward of the outer combustion chamber wall 140 a short distance, as shown in FIG. 7. This locator ring may be supported by any suitable open structure, such as rod-shaped support members 165. The open structure permits exhaust gases to pass downwardly out of the combustion chamber in a substantially unrestricted manner.

The bottom of the combustion chamber 130 is open, and the exhaust gas generated by the combustion process exits down out of the combustion chamber 130. The gas then mixes turbulently with cooling air, as explained below, and enters a flue gas plenum 168 that directs the warm flue gas mixture downward and toward the side of the incinerator 110, where it exits the incinerator 110 through the flue gas outlet 116. The plenum 168 is designed to direct particulate combustion products downward and out of the flue gas outlet 116 without level surfaces on which such particulates can accumulate. The illustrated embodiment shows a plenum 168 that slopes toward the outlet 116 so that particulates will tend to be carried down and out of the incinerator 110 by movement of the flue gas/cooling air mixture.

In one preferred embodiment, the incinerator is adapted to operate with negative pressure applied to the flue gas outlet. This negative pressure, for example, is applied to the ductwork into which the flue gas travels as it leaves the incinerator 110 by a conventional scrubber or other device. Such negative pressure may be used to further cool the flue gas by drawing outside cooling air into the incinerator through louvers 166 on the housing 112 of the incinerator 110. These louvers 166 are preferably located below the combustion chamber 130. A cooling jacket 170 is provided on the incinerator, which comprises a wall 172 spaced a small distance inside the housing 112, with a vertically extending gap between the housing 112 and the cooling jacket wall 172. This gap is open at the top to the inside of the incinerator 110 above the combustion chamber 130 and to outside air at the bottom, so that the outer housing 112 of the incinerator 110 remains relatively cool due to low thermal conductivity between the cooling jacket wall 172 and the outer housing 112, as well as the movement of cool air upward through the gap between the cooling jacket wall 172 and the housing 112. Cooling air thus moves up through the cooling jacket 170, into the top 122 of the incinerator 110, and then flows down around the outside of the heat exchanger jacket 136. As it passes below the combustion chamber 130, turbulent mixing of the cooling air and the exhaust gas occurs. The mixture continues downward into the plenum 168 and out through the flue gas outlet 116. Mixing is facilitated by the right angle turn made by the gas in the plenum 168. It is important to assure complete mixing so that there is not a hot core of flue gas in the exiting gas mixture.

One aspect of the second embodiment of the incinerator 110 that is particularly significant is the provision of air jets for removal of particulates from the interior of the incinerator.

Figure 9:
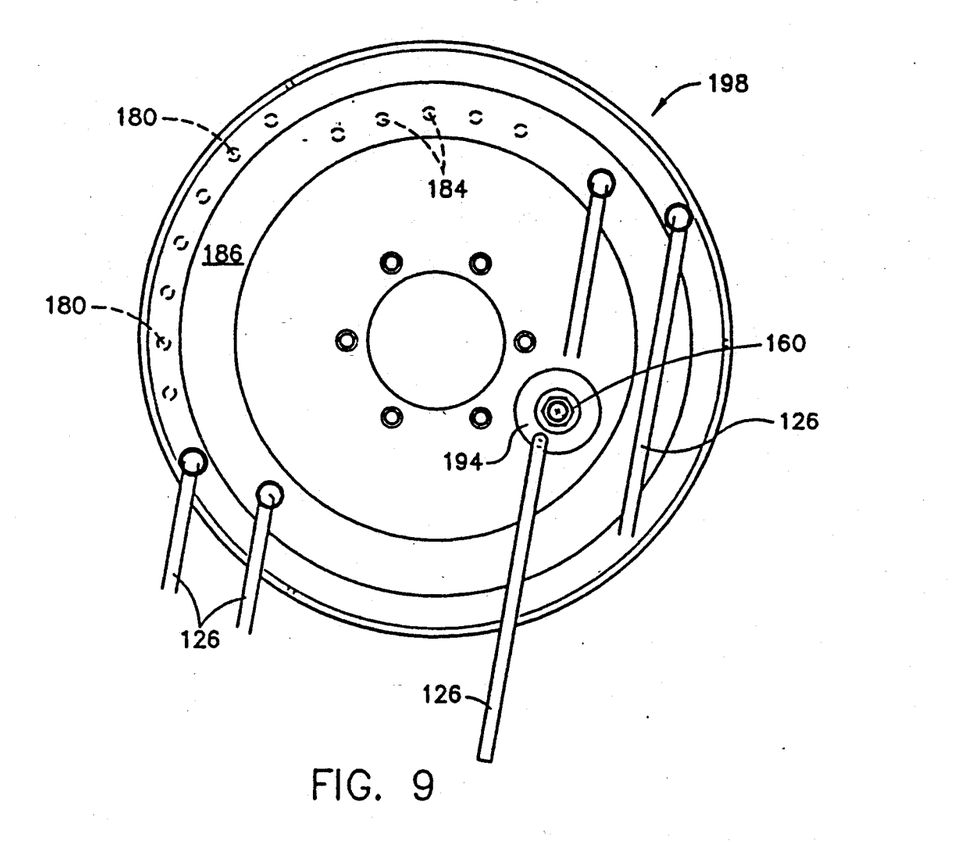
FIG. 9 is a plan view of the top of the combustion chamber of FIG. 7.

As illustrated in FIGS. 7 and 9, there is a first gap over the top of the outer wall 140 of the combustion chamber 130 through which combustion air from the heat exchanger 134 passes as it reverses direction and enters the combustion zone. In a preferred embodiment of the invention, a ring of first cleaning jets 180 is placed around the top of the heat exchanger jacket 136. From about 4 to about 40 first cleaning jets 180 can be used to keep the air passageway over the top of the outer wall 140 clear of deposits. The first cleaning jets can be supplied by a first jet manifold 182 which is connected to the compressed air inlet line 126 or other source of compressed gas.

A ring of second cleaning jets 184 may also be provided, these directed downwardly from the top of the combustion chamber 130 through the combustion zone and into the gap between the bottom edge of the flow director 162 and the outer wall 140 of the combustion chamber 130. These jets can be supplied with compressed air from a second jet manifold 186 (see FIG. 9) which is connected to the compressed air inlet line 126 or other source of compressed gas. Any effective number of second cleaning jets 184 (see FIG. 9) can be provided; however, there will generally be between about four and forty such jets 184.

A third location in which cleaning jets can be advantageously provided is in the vicinity of the igniter 160, which may become covered with particulate combustion products. In the illustrated embodiment, third cleaning jets 190 (see FIG. 8) are provided directed at the spark gap of the igniter 160 (see FIG. 9). These jets may be situated, for example, on downwardly extending jet supports 192, arranged radially around the igniter 160. These jets can be directed horizontally inward toward the igniter 160. The jet supports 192 preferably have gaps between them to provide adequate contact between the combustion mixture and the igniter 160. A third jet manifold 194 (shown in FIG. 9) can be provided to supply compressed gas through third tubes 195 to the third cleaning jets 190 from the compressed air inlet line 126 or from any other suitable source.

Figure 8:
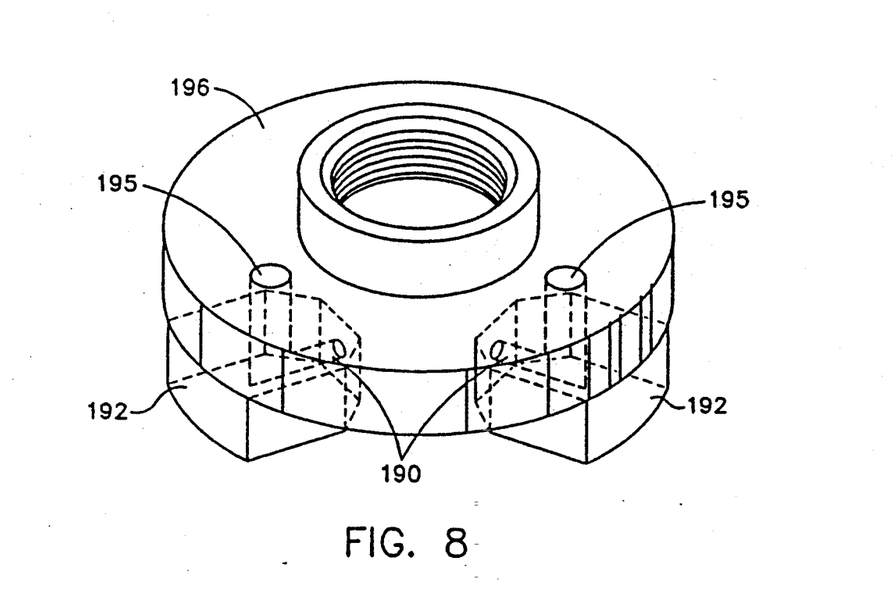
FIG. 8 is a perspective view of an igniter holder and air jet assembly

In one embodiment of the invention, illustrated in FIGS. 8 and 9, the third jets 190 and the jet supports 192 are formed in an igniter holder 196. This igniter holder 196 can be threaded to receive the igniter 160, and is mounted in the top plate 198 (see FIG. 9) of the combustion chamber 130. The third tubes 195 and the jets 190 are illustrated in phantom in FIG. 8.

The particular layout of the various jets can be appreciated by reference to FIG. 9, which is a plan view of the top 198 of the combustion chamber 130, with the locations of representative first and second jets 180, 184 shown in phantom. The top 198 is preferably made of heavy gauge steel, and is provided with means for supplying compressed air to the various jets 180, 184, 190. The attachment of the compressed air inlet lines 1 the jet manifolds 182, 186, 194 is illustrated in this Figure. Note that the first and second jet manifolds 182, 186 have more than one compressed air inlet line 126 in order to improve the pressure balance from side to side in the manifolds.

It should be emphasized that the placement and configuration of the cleaning jets will vary depending on where particulate combustion products tend to accumulate in any particular design. For example, any restricted space through which combustion gases must flow or which must remain unobstructed can advantageously be kept clear through use of these jets. These jets are useful for any light, fluffy particulates which do not adhere strongly to the hot surfaces in the combustion chamber.

In use, it is preferred that the jets be periodically activated to clear accumulated material. For example, each half hour of operation of the incinerator 110, the first and second cleaning jets 180, 184 could be activated for about 1 second. The third cleaning jets 190 may advantageously be activated for about 1 second any time it is necessary to fire the igniter 160. Activation can be simultaneous or sequential. Simultaneous activation is preferred when sequential activation can cause backflow. Where the igniter is fired continuously, the third cleaning jets 190 may be activated, for example, every 15 to 30 minutes. Of course, the frequency of activation of the jets 180, 184, 190 will depend on the rate of buildup of particulates, and for any particular device or process gas stream, the optimum frequency can be determined empirically. Compressed air at about 80 psig directed through a nozzle having a diameter of about one sixteenth inch has been found to be effective in one embodiment of the present invention.

During the operation of a typical incinerator 10, 110, or 210 of the preferred or alternate embodiments having one or more 2-inch process gas inlet 14, 114 or 214 and a combustion chamber volume of ⅛ cubic foot, process gas comprising 1–3 scfm $N_2$ with 0–10 scfm $H_2$ and smaller amounts of oxidizable impurities such as arsine, silane, phosphine, or diborane is combined with sufficient natural gas or other gaseous fuels to sustain combustion (typically from 0.5–2 scfm at about 6 inches pressure ($H_2O$)). Compressed air is introduced into the swirl nozzle 24, 124, or 224 at a rate of from 0 to 2 scfm, 80 psig. The preheated air from the fan 42, 142, or 242 enters the combustion zone at a rate of from about 10–40 scfm, at a preheated temperature of about 400° C. The negative pressure applied to the flue gas outlet draws air and gas out of the incinerator at a rate of about 500–1000 scfm.

Although the present invention has been described in the context of certain preferred embodiments, it will be understood that modifications are possible without departing from the spirit of the invention. Thus, it is intended that the scope of this patent be measured by the claims that follow, and not be limited to these preferred embodiments.

We claim:

1. A device for oxidizing materials in a gas stream, comprising:
    a combustion chamber in said device, said device and said combustion chamber both having a top and a bottom, said device further having a gas outlet and being adapted to operate in conjunction with means applying negative pressure to said outlet;
    means for introducing process gas and a source of fuel into the top of said combustion chamber;
    means for introducing oxygen carrying gas into the top of said combustion chamber;
    means for mixing said oxygen carrying gas with said process gas and fuel so that said mixture can burn in said combustion chamber to form an exhaust gas;
    means for directing said mixture outwardly toward the wall of said combustion chamber as it is burning;
    means for permitting said gas to exit from the bottom of said combustion chamber; and
    means for directing said gas from said combustion chamber out of the outlet of said device.

2. The device of claim 1, wherein said mixture directing means has a conical configuration and has an apex at the top thereof.

3. The device of claim 1, wherein said means for introducing process gas is located sufficiently below the top of said combustion chamber that solid combustion byproducts do not substantially deposit in said combustion chamber above said means for introducing process gas.

4. The device of claim 1, wherein said means for introducing fuel comprises one or more sonic jets.

5. The device of claim 1, further comprising a mechanical scraper for removing solid products of combustion from the mixture directing means and from the walls of said combustion chamber.

6. The device of claim 1, further comprising a mechanical scraper for removing solid products of reaction from the process gas/fuel inlet and mixing means.

7. The device of claim 6, wherein said scraper comprises one or more extensible blades which are spring loaded to extend radially outward.

8. The device of claim 6, further comprising means for intermittently advancing and retracting said scraper.

9. The device of claim 8, further comprising means for simultaneously rotating said scraper.

10. The device of claim 1, further comprising a removable tray beneath said combustion chamber for collecting solid products of combustion.

11. The device of claim 1, further comprising a flame holder in said combustion chamber for holding a flame generated by said burning mixture.

12. A device for oxidizing materials in a gas stream, comprising:
    a combustion chamber in said device, said device and said combustion chamber having a top and a bottom and a vertical axis;
    a preheater chamber located radially outside of said combustion chamber adapted to preheat oxygen-containing gas;
    a mixing zone at the top of said combustion chamber;
    means for introducing oxygen-containing gas into said preheater chamber;
    means for introducing oxygen-containing gas from said preheater, fuel, and impurity-containing process gas into said mixing zone;
    a first swirler for swirling said oxygen-carrying gas entering said mixing zone in a first direction;
    a second swirler for swirling said process gas entering said mixing zone in a second direction;
    an opening at the bottom of the combustion chamber through which exhaust gas can exit said chamber; and
    means for removing accumulations of particulate products of combustion from said incinerator.

13. The device of claim 12, further comprising a vertical flue located concentrically outside of said preheater chamber for directing said flue gas exiting said chamber upward and out of the top of said device, and means for cooling said flue gas via mixing said flue gas with cooling air.

14. The device of claim 12, further comprising a conduit supplying process gas into said chamber, and means for introducing sufficient nonflammable gas into said conduit to raise the flow rate of gas in said conduit above the flame propagation speed for the gas in said conduit.

15. The device of claim 14, further comprising means for cooling said conduit via directing the path of a gas over the outer surface of said conduit.

16. The device of claim 12, further comprising means in said combustion chamber for directing a mixture of oxygen-containing gas, fuel, and process gas in said mixing zone radially outwardly.

17. The device of claim 12, wherein said removing means comprise mechanical scrapers movable inside said combustion chamber and inlet means in contact with the surfaces within these means.

18. The device of claim 12, wherein said first and second swirling means are adapted to swirl said process gas or fuel and said oxygen-containing gas in a manner so that when said swirling gases are combined, turbulent mixing occurs with cancellation of at least a portion of said swirling.

19. The device of claim 12, wherein said second swirling means swirls both said fuel and said process gas prior to their contact with said oxygen-containing gas.

20. The device of claim 12, wherein said second swirling means comprises an oxygen-containing gas jet impinging on said process gas or said fuel.

21. A method for oxidizing materials in a gas stream comprising the steps of:
    introducing fuel and process gas into a combustion chamber, said chamber having walls;

introducing preheated oxygen/carrying gas into said combustion chamber and mixing it with said fuel and process gas to form a burning mixture;

directing said burning mixture outwardly toward a wall of said combustion chamber as it is burning and forming an exhaust gas which exits said combustion chamber;

preheating said oxygen carrying gas prior to its entry into said combustion chamber with heat from said oxidation of said fuel; and mechanically scraping accumulated solid combustion products from the walls of said chamber.

22. The method of claim 21, wherein said preheating step comprises passing said oxygen-carrying gas upward over the outside of said combustion chamber.

23. The method of claim 21, wherein said mixing step comprises swirling the preheated gas entering said combustion chamber in a first direction and swirling the fuel and process gas entering said combustion chamber in a second, opposite direction, so that turbulent mixing occurs when said swirling gases collide.

24. The method of claim 23, wherein one of said swirling gases is introduced into said combustion chamber radially inwardly of another of said swirling gases, and at a point sufficiently below the top of said combustion chamber that solid products of combustion do not accumulate on said top.

25. The method of claim 21, further comprising the step of cooling said exhaust gas by mixing it with cooling air.

26. The method of claim 21, comprising the step of preventing flashback into a conduit supplying process gas into the combustion chamber by reducing the cross-sectional area of the conduit and by introducing sufficient nonflammable gas into said conduit upstream of said chamber that the flow rate of gas in said conduit is greater than the flame propagation speed in the resulting gas mixture.

* * * * *